(12) United States Patent
Zhang et al.

(10) Patent No.: US 7,528,846 B2
(45) Date of Patent: May 5, 2009

(54) SYSTEMS AND METHODS TO ADJUST A SOURCE IMAGE ASPECT RATIO TO MATCH A DIFFERENT TARGET DISPLAY ASPECT RATIO

(75) Inventors: Dongmei Zhang, Bellevue, WA (US); Mehul Y. Shah, Redmond, WA (US); Vladimir Rovinsky, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 639 days.

(21) Appl. No.: 11/064,298

(22) Filed: Feb. 23, 2005

(65) Prior Publication Data

US 2006/0188173 A1    Aug. 24, 2006

(51) Int. Cl.
*G09G 5/00* (2006.01)
*G06K 9/34* (2006.01)
*G06F 3/00* (2006.01)
*H04N 1/405* (2006.01)

(52) U.S. Cl. .................. 345/619; 382/173; 715/700; 358/3.2

(58) Field of Classification Search ........... 345/619; 358/3.2; 715/700; 382/173
See application file for complete search history.

(56) References Cited

U.S. PATENT DOCUMENTS

2003/0152291 A1* 8/2003 Cheatle ................. 382/296
2004/0145593 A1* 7/2004 Berkner et al. .......... 345/619
2004/0165784 A1* 8/2004 Xie et al. ................ 382/254
2004/0223628 A1* 11/2004 Call et al. ............... 382/101
2005/0001931 A1* 1/2005 Kahn ..................... 348/556
2005/0212817 A1* 9/2005 Cannon et al. .......... 345/619
2006/0280364 A1* 12/2006 Ma et al. ................ 382/173

OTHER PUBLICATIONS

Adobe® Photoshop® Elements 2.0 User Guide, 2002, Merriam-Webster Inc./Franklin Electronic Publishers Inc., p. 80.*
Dahl et al.; Photoshop Elements 2 for Windows and Macintosh: Visual QuickStart Guide; Sep. 18, 2002; Peachpit Press; Chapter 6, Cropping an Image, Straightening an Image; Chapter 7, Applying Filters and Effects, Simulating Action With Blur Filters.*

* cited by examiner

*Primary Examiner*—Xiao M. Wu
*Assistant Examiner*—David T Welch
(74) *Attorney, Agent, or Firm*—Lee & Hayes, PLLC

(57) ABSTRACT

Systems and methods for adjusting a source image aspect ratio to match a different target display aspect ratio are described. In one aspect, the systems and methods determine that a source image has a first aspect ratio that is different than a second aspect ratio of a target display. Responsive to this determination, primary visual content of the source image is automatically detected. Dimensions and position of a crop of the source image are automatically calculated such that the crop preserves at least a subset of the primary visual content in the crop. Additionally, the crop is based on the second aspect ratio.

19 Claims, 7 Drawing Sheets

SYSTEMS AND METHODS TO ADJUST A SOURCE IMAGE ASPECT RATIO TO MATCH A DIFFERENT TARGET DISPLAY ASPECT RATIO

TECHNICAL FIELD

This disclosure relates to image processing.

BACKGROUND

Image-based video is essentially a slide show of images with motion, e.g. panning and zooming applied to still images, and transitions applied between images, to create a moving picture effect. When creating an image-based video, an input source image may have a different aspect ratio than the aspect ratio of the video output being generated. Such aspect ratios represent the relation of the width to the height of a picture. The aspect ratio of the video is a function of the video port, for example, the aspect ratio of 4:3. When the aspect ratio of the input image is not the same as that of the video port, a technique called "enveloping" is typically used to generate the image-based video. If the full picture needs to be displayed in the video, enveloping causes black borders to appear in the video.

For example, FIG. 1 shows an exemplary video frame 100 with an aspect ratio of 640×480 (width×height) that encapsulates a source image 102 with an aspect ratio of 640×300). Since the aspect ratio of the video frame is 4:3 and the aspect ratio of the image is not the same (the source image has a different height), conventional techniques envelope the image with black borders (e.g., borders 104 and 106). Displaying such black borders when playing an image-based video is aesthetically unpleasing, and can substantially detract a user's viewing experience.

SUMMARY

Systems and methods for adjusting a source image aspect ratio to match a different target display aspect ratio are described. In one aspect, the systems and methods determine that a source image has first aspect ratio that is different than a second aspect ratio of a target display. Responsive to this determination, primary visual content of the source image is automatically detected. Dimensions and position of a crop of the source image are automatically calculated such that the crop preserves at least a subset of the primary visual content in the crop. Additionally, the crop is based on the second aspect ratio.

BRIEF DESCRIPTION OF THE DRAWINGS

In the Figures, the left-most digit of a component reference number identifies the particular Figure in which the component first appears.

DETAILED DESCRIPTION

Overview

Figure 1:
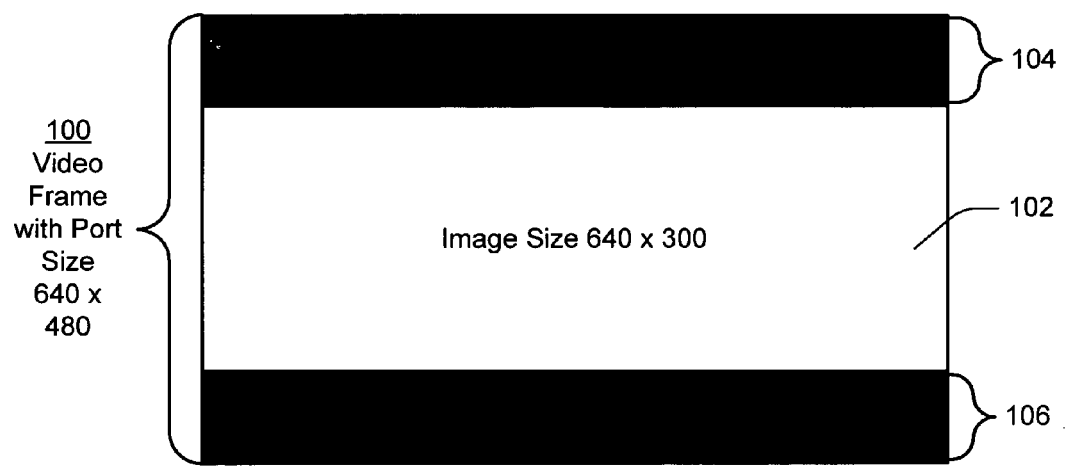
FIG. 1 illustrates an exemplary prior art image in an image-based video, wherein a source image has an aspect ratio different than the image-based video (e.g., a target display with a different target aspect ratio). The prior art image is presented by conventional techniques with black borders, reflecting the different aspect ratios.

Systems and methods for adjusting a source image aspect ratio to match a different target display aspect ratio are described. In one implementation, the systems and methods provide a user interface for a user to adjust image aspect ratios when different input source image and video output aspect ratios are encountered, for example, when creating image-based video. When an original source image (picture) is imported into an application that creates an image-based video, the systems and methods automatically determine whether the aspect ratio of the imported image matches the aspect ratio of the target display. The target display can be represented by different type of applications. In one implementation, and for purposes of exemplary illustration, the target display is described with respect to an image-based video. If the aspect ratios are different, the systems and methods to analyze the image and automatically generate a suggested crop of the image with an aspect ratio that matches the video aspect ratio while preserving primary visual content of the image. The systems and methods automatically, or responsive to user direction, crop the source image based on this suggested crop. Cropping the source image according to the suggested crop, or according to a user modification of the suggested crop that maintains the target aspect ratio, creates an aesthetically pleasing frame when presented in the target display (e.g., the image-based video). This is because it eliminates black borders that otherwise would have enveloped the source image representation on the target display.

In one implementation, the systems and methods implement attention analysis to automatically detect and preserve primary content and visual interest of the imported image within a suggested crop area. In one implementation, when a user adjusts dimensions of a suggested crop area, the systems and methods maintain the proper aspect ratio of an image to match the target display aspect ratio. The entire image can be utilized when pan or/and zoom motions are applied to the image either automatically or manually during image-based video authoring. Additionally, in one implementation, the cropped image is stored such that the entire image (uncropped image) remains readily and easily accessible.

These and other aspects of the systems and methods for adjusting a source image aspect ratio to match a different target display aspect ratio are now described in greater detail.

An Exemplary System

Although not required, the systems and methods for adjusting a source image aspect ratio to match a different target display aspect ratio are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
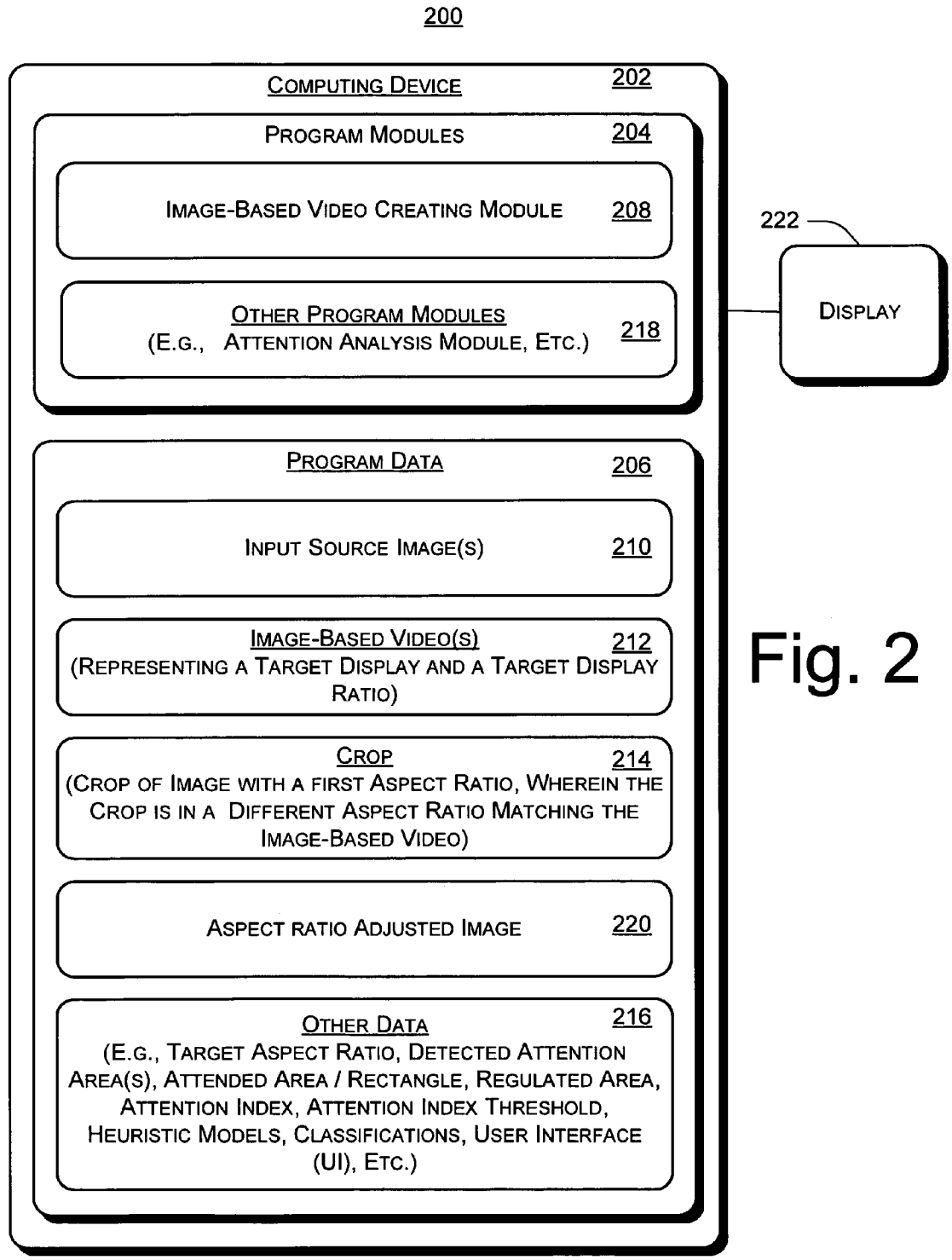
FIG. 2 illustrates an exemplary system for adjusting a source image aspect ratio to match a different target display aspect ratio.

FIG. 2 illustrates an exemplary system 200 for adjusting a source image aspect ratio to match a different target display aspect ratio. In this implementation, system 200 includes computing device 202. Computing device 202 is any type of computing device such as a personal computer, a laptop, a server, small form factor mobile computing device (e.g., a cellular phone, personal digital assistant, or handheld computer), etc. Computing device 202 includes program modules 204 and program data 206. Program modules 202 include, for example, one or more computer-program modules to adjust source image aspect ratios to match a target display aspect ratio during image-based video creation. For instance, in this implementation, image-based video creating module 208 allows a user to adjust the aspect ratio of input source image 210 to match a target aspect ratio. In this implementation, the target aspect ratio is the aspect ratio of the image-based video 212 being created. For example, an image-based video 212 with an associated video port of 640×480 has an aspect ratio of 4:3.

To this end, when a source image 210 is imported for use in an image-based video 212, image-based video creating module 208 automatically determines whether the aspect ratio of the source image 210 matches the target aspect ratio of the resulting image-based video 212. If not, image-based video creation module 208 analyzes the source image to detect primary content or area(s) of primary interest in the image. Such area(s) are typically associated with portion(s) of the image with high attention value. Image-based video creating module 208 uses detected areas of high attention value to determine dimensions and position of crop 214. Crop 214 is generated with the target aspect ratio. Crop 214 substantially encapsulates the primary content of the image (i.e., as much as possible).

Figure 3:
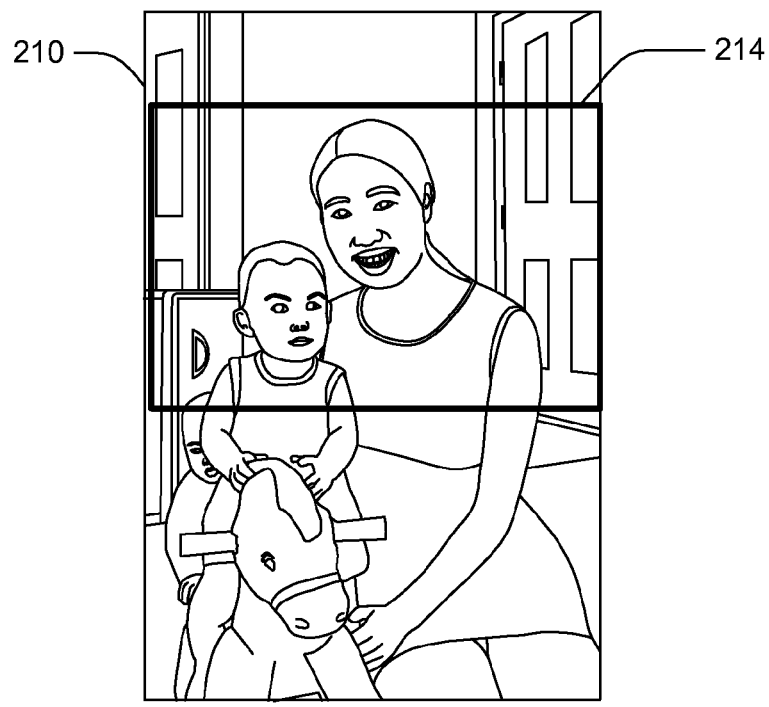
FIG. 3 shows an exemplary image with an exemplary suggested crop. The image has a different aspect ratio compared to a target display aspect ratio, for example, of an image-based video. The crop has the same aspect ratio as the target display aspect ratio.
Figure 4:
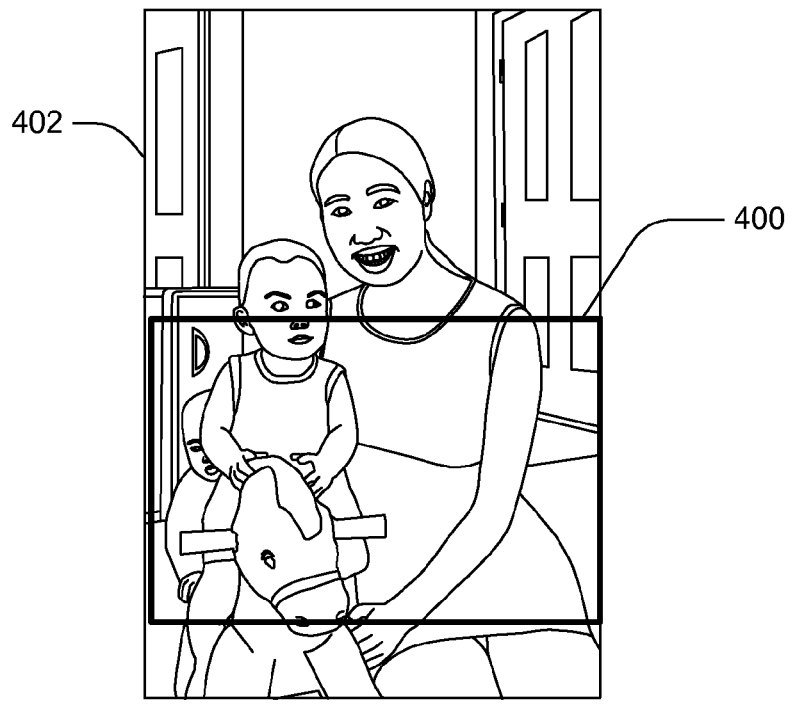
FIG. 4 shows an exemplary crop of an image, wherein the crop does not retain primary content of the image within the crop.

FIG. 3 shows an image 210 with an exemplary crop 214. (In the Figures, the left-most digit of a component reference number identifies the particular Figure in which the component first appears). In this example, image 210 does not have the same aspect ratio as a target aspect ratio of an image-based video 212. Crop 214 has the same aspect ratio as the target aspect ratio. Crop 214 encapsulates primary content or area(s) of primary interest of image 300, as detected by attention analysis of image 210. Techniques to perform attention analysis on an image are known. (An exemplary attention analysis program module is shown as a respective portion of "other program modules" 218 of FIG. 2). That is, primary content of the picture, which in this example is human faces, is not lost due to automatic crop dimension and position determination operations of image-based video creating module 208. For purposes of comparison, FIG. 4 shows an exemplary crop 400 that does not retain primary content of the image 402 within the crop 400.

In one implementation, image-based video creating module 208 implements attention analysis of an imported image 210 as described in U.S. patent application Ser. No. 10/676, 519, titled "A Contrast-Based Image Attention Analysis Framework", filed on Sep. 30, 2003, commonly assigned hereto, and hereby incorporated by reference. In this latter implementation, the attention analysis program module evaluates image 210 in view of heuristic models (e.g., color differentials in different sections of the image) to determine area(s) of the image that contain relatively most significant information. The attention analysis program module determines these "attention areas" in the form of rectangular regions.

Figure 5:
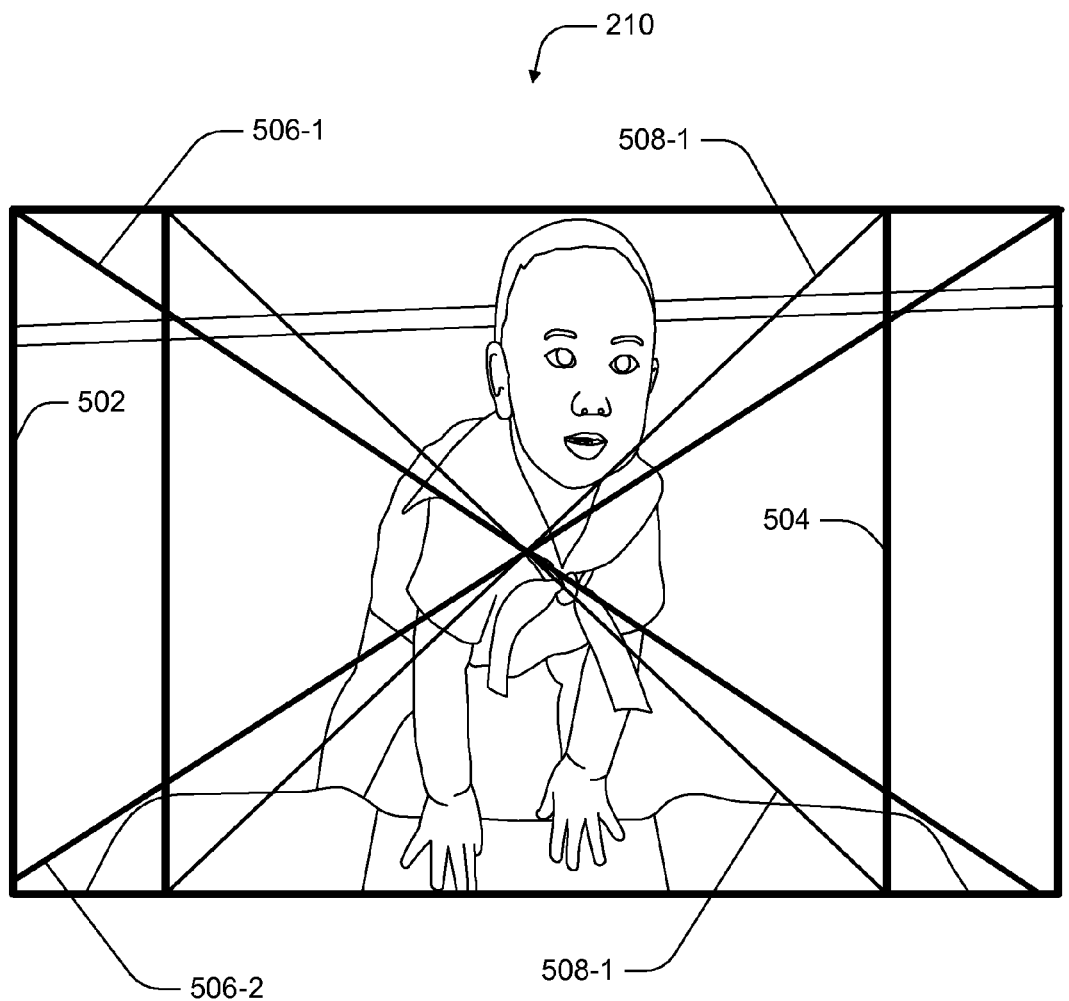
FIG. 5 shows an exemplary image with calculated attended and regulated areas.

The smallest rectangle in the picture that is a superset of these 'attention areas' (i.e., the smallest rectangle which contains all the attention areas) is called an "attended area". For example, if a picture has dimension of m×n pixels, image-based video creation module 208 determines an attended rectangle of size m'×n' pixels, wherein m'<=m and n'<=n. FIG. 5 shows an exemplary image 210 with a calculated attended area 502 of size m'×n' pixels, wherein m'<=m and n'<=n. In this example, attended area 502 is delineated with a light colored block encapsulating the majority of image 210.

Image-based video creation module 208 determines a regulated rectangular area (e.g., with size p×q), which is concentric to m'×n' and has a same aspect ratio (i.e., target aspect ratio) as that of the video port associated with the image-based video 212. In the example of FIG. 5, regulated area 504 is shown by a rectangle that is darker than the attended area rectangle, bordering the attended area rectangle to the north and south, and closer to the center of the image 210 to the east and west. In this implementation, the regulated area represents dimensions and position of crop 214. The intersection of the two white lines 506-1 and 506-2 represents the center of the attended rectangle. The intersection of the two darker lines 508-1 and 508-2 indicates the center of the regulated rectangle. The overlapping of these two intersections shows that the attended rectangle and the regulated rectangle are concentric.

To quantify image content quality of crop 214, image-based video creating module 208 calculates an attention index, which is a ratio between a portion of the attended area that is contained in the cropped rectangle (crop 214) versus the total attended area. Referring to FIG. 5, the Attention Index is a ratio of area of the inner rectangle 504 to area of the outer rectangle 502. Crop 214 is a good crop (i.e., primary content of the original picture (image 210) are preserved in crop 214) when the attention index is higher than a pre-defined threshold. For purposes of exemplary illustration, a calculated attention index, an attended area, and an attention index threshold are shown as respective portions of "other data" 216.

Removing Black Borders

As described above, image-based video creating module 208 evaluates source image(s) 210 to determine if the aspect ratio of the source image 210 is different than the aspect ratio of a target image-based video 212. Responsive to detecting such a difference, image-based video creating module 208 automatically generates crop 214 of the source image. Crop 214 has the same aspect ratio as the target image-based video 212. In one implementation, image-based video creating module 208 automatically crops image 210 based on crop 214. This creates aspect ratio adjusted image 220, which is used in image-based video 212. The aspect ratio of aspect ratio adjusted image 220 matches the aspect ratio of image-based video 212. Thus, no black borders or 'envelopes' are used when displaying a representation of the source image 210 in the resulting video.

In another implementation, image-based video creator (creating module) 208 displays the source image 210 in a user interface (UI) on a display 222. The user interface is shown as a respective portion of "other data" 216. Image-based video creator 208 presents a crop area over the displayed source image to a user. The crop area has dimensions and position of crop 214. The UI includes a control such as a "remove black borders button". Responsive to user selection of the button, image-based video creator 208 crops the source image 210 using crop 214 to generate aspect ratio adjusted image 220. In another implementation, image-based video creator (creating module) 208, via the UI, allows a user to view, select, and/or adjust or reject crop 214 within the source image 210, while maintaining the aspect ratio of crop 214 equal to that of the target image-based video 212.

Figure 6:
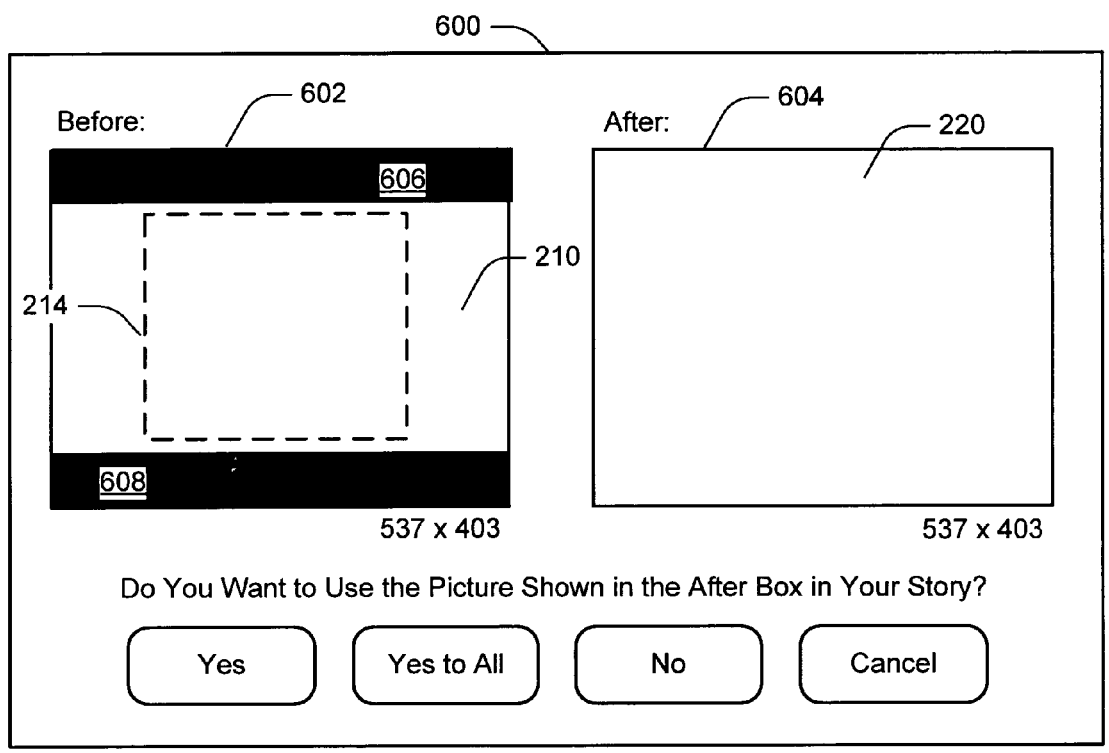
FIG. 6 shows an exemplary dialog box to allow a user to accept, adjust or reject the results of the automatic cropping a source image to a target display aspect ratio.

FIG. 6 shows an exemplary dialog box 600 allowing a user to view, select, and/or adjust or reject crop 214 within the source image 210, while maintaining the aspect ratio of crop 214 equal to that of the target display. Image-based video creator 208 presents dialog box 600 to the user during image import operations, and after determining that the dimensions of the source image are not the same as the dimensions of the target display (i.e., target image-based video 212). In this implementation, dialog box 600 includes "Before" box, or window, 602 and "After" box, or window, 604, as well as a number of user selectable controls to accept or reject image editing results of the dialog box.

More particularly, the "Before" box (or window) 602 presents a source image 210 with respect to the target display aspect ratio, which in this example is 4:3. Since source image 210 was not generated with this particular aspect ratio, the source image is shown in the "Before" window 602 with black borders 606 and 608. These black borders would be shown in the target display if source image 210 is not cropped to the target display aspect ratio of 4:3 before presentation on the target display. In this example, the black borders 606 and 608 are respectively located at the top and bottom of source image 210.

"Before" window 602 also presents automatically determined crop 214 on top of the source image 210 in the "Before" window. As described above, dimensions and position of crop 214 have been determined as a function of the target display aspect ratio to encapsulate substantially as much of the primary content as possible. "After" window 604 shows what cropping source image 210 with crop 214 applied (i.e., showing aspect ratio adjusted image 220) would look like. If the user would like to adjust boundaries of crop 210, for example, to encapsulate more or less content of source image 210, these boundaries can be adjusted by selecting a handle on crop 214 outline in "Before" window 602 (handles not shown), and dragging the crop boundaries to the desired dimension. As crop 214 dimensions are being adjusted, image-based video creator 208 maintains the aspect ratio of the target display, and dynamically present the results in "After" box 604.

Dialog box button controls, shown at the bottom of dialog 600, allow a user to use the picture shown in the "After" box 604 in the target aspect ratio. In this example, the picture shown in the "After" box 604 is for use in image-based video 212. Selection of the "Yes to All" control will cause image-based video creator 208 to automatically remove black borders from a queue of imported pictures. In one implementation, such removal is performed only when image-based video creator 208 determines, for example, via image attention analysis, that the black border removal can be achieved while retaining primary visual content of the images and therefore will result in meaningful and aesthetically pleasing image-based video.

An Exemplary Procedure

Figure 7:
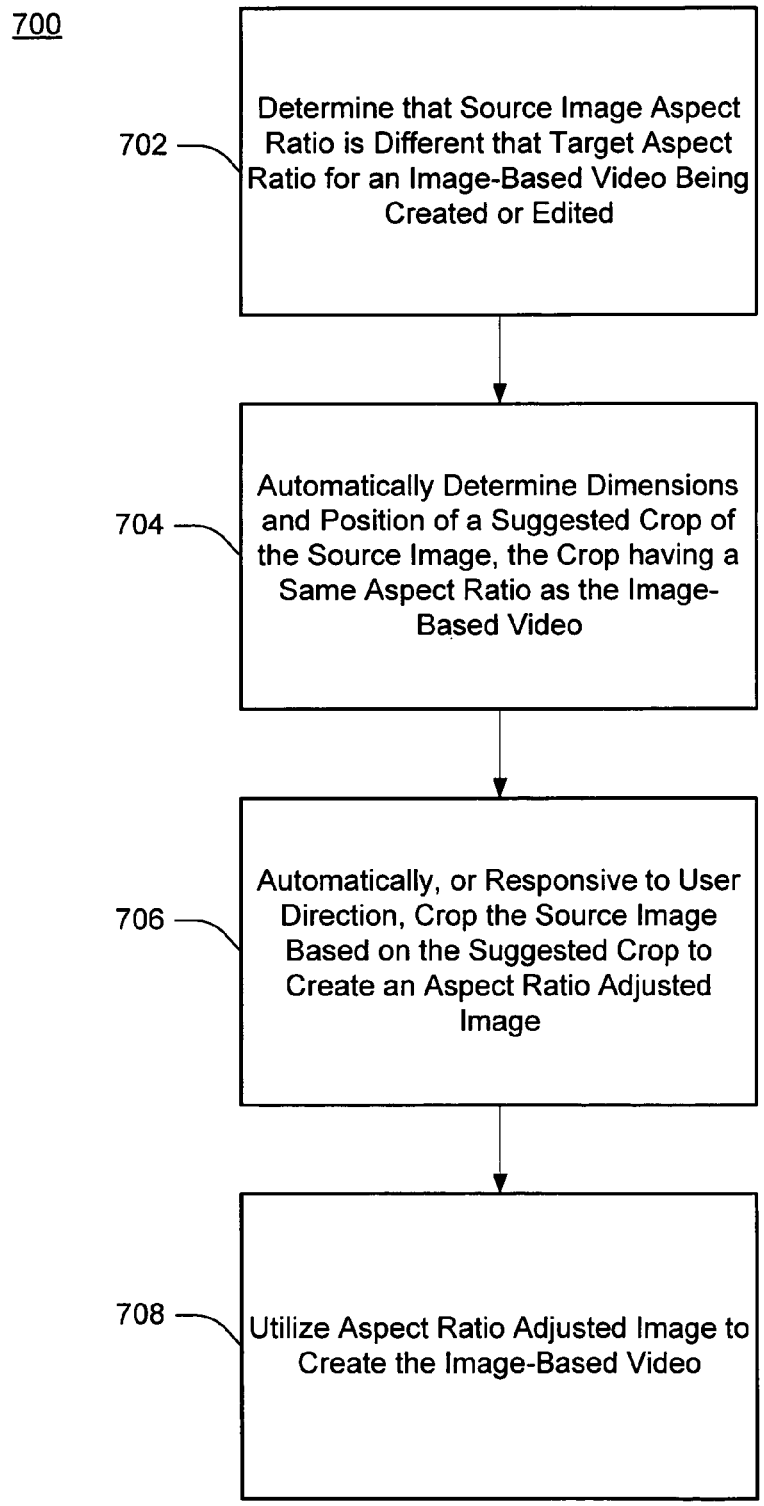
FIG. 7 shows an exemplary procedure for adjusting a source image aspect ratio to match a different target display aspect ratio.

FIG. 7 shows an exemplary procedure 700 for adjusting an image-based video input source image aspect ratio to match a target aspect ratio of an image-based video. For purposes of discussion and illustration, operations of the procedure are described with respect to components of FIG. 2. The left-most digit of a component reference number identifies the particular figure in which the component first appears. At block 702, image-based video creator 208 (FIG. 2) evaluates a source image 210 to determine if the aspect ratio of the source image 210 is different than the aspect ratio of a target image-based video 212. At block 704, and responsive to detecting such a difference, image-based video creator 208 automatically generates crop 214 of the source image. Crop 214 has the same aspect ratio as that of the target image-based video 212. In one implementation, the operations of block 704 include attention analysis operations on the source image 210 to detect and preserve substantially as much as possible of the primary content and visual interest of the imported image within crop 214. Thus, the operations of block 704 automatically determine dimensions and position of a suggested crop.

At block 706, image-based video creator 208 automatically or responsive to user direction, crops source image 210 according to crop 214 to generate aspect ratio adjusted image 220. In one implementation, if the aspect ratio adjusted image 220 is generated responsive to user direction, image-based video creator 208 allows the user to manually adjust dimensions and position of crop 214, while maintaining proper aspect ratio of the adjusted crop 214. At block 708, image-based video creator 208 utilizes the resulting aspect ratio adjusted image 220 in image-based video 212.

An Exemplary Operating Environment

Figure 8:
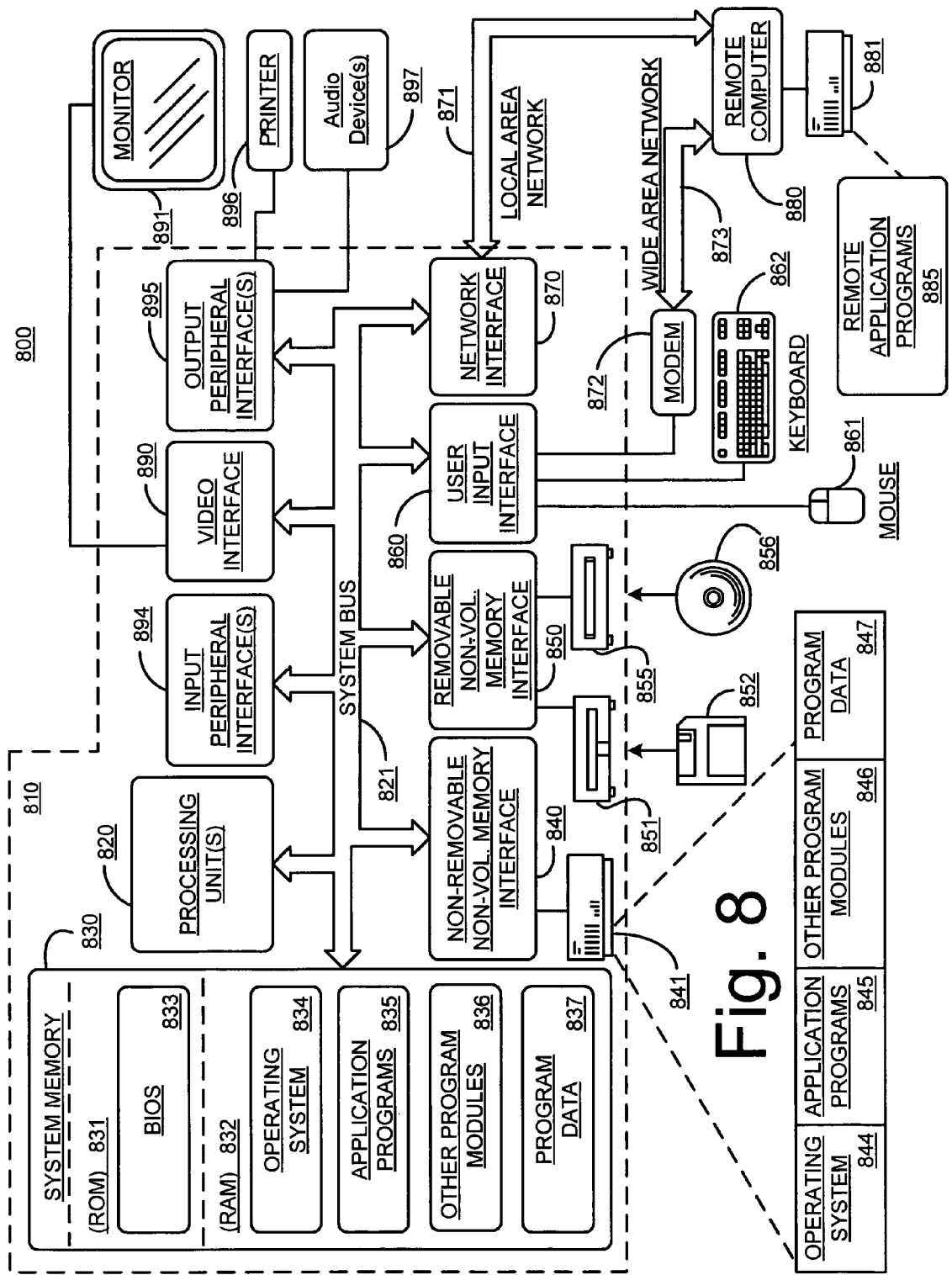
FIG. 8 shows an example of a suitable computing environment in which systems and methods for adjusting a source image aspect ratio to match a different target display aspect ratio may be fully or partially implemented.

FIG. 8 illustrates an example of a suitable computing environment 800 in which the systems and methods for adjusting a source image aspect ratio to match a different target display aspect ratio may be fully or partially implemented. Exemplary computing environment 800 is only one example of a suitable computing environment for the exemplary system of FIG. 2 and exemplary operations of FIG. 7, and is not intended to suggest any limitation as to the scope of use or functionality of systems and methods the described herein. Neither should computing environment 800 be interpreted as having any dependency or requirement relating to any one or combination of components illustrated in computing environment 800.

The methods and systems described herein are operational with numerous other general purpose or special purpose computing system, environments or configurations. Examples of well-known computing systems, environments, and/or configurations that may be suitable for use include, but are not limited to, personal computers, laptops, small form factor mobile computing device (e.g., a cellular phone, personal digital assistant, or handheld computer), server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 8, an exemplary system 800 illustrates an example of a suitable computing environment in which systems and methods for adjusting a source image aspect ratio to match a different target display aspect ratio may be fully or partially implemented. System 800 includes a general purpose computing device in the form of a computer 810 implementing, for example, computing device 202 of FIG. 2. Components of computer 810 may include, but are not limited to, processing unit(s) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 810 typically includes a variety of computer-readable media. Computer-readable media can be any available media that can be accessed by computer 810 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Application programs 835 include, for example, program modules 204 of FIG. 2. Program data 837 includes, for example, program data 206 of FIG. 2. Operating system 844, application programs 845, other program modules 846, and program data 847 are given different numbers here to illustrate that they are at least different copies.

A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as input peripheral interface(s) 894 which may include a parallel port, game port or a universal serial bus (USB).

A monitor 891 or other type of display device is also connected to the system bus 821 via an interface, such as a video interface 890. In addition to the monitor, computers may also include other peripheral output devices such as printer 896 and audio devices 897, which may be connected through an output peripheral interface 895.

The computer 810 operates in a networked environment using logical connections to one or more remote computers, such as a remote computer 880. The remote computer 880 may be a personal computer, a server, a router, a network PC, a peer device or other common network node, and as a function of its particular implementation, may include many or all of the elements (e.g., program module(s) 204 and program data 206, etc.) described above relative to the computer 202, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example and not limitation, FIG. 8 illustrates remote application programs 885 as residing on memory device 881. The network connections shown are exemplary and other means of establishing a communications link between the computers may be used.

Conclusion

Although the systems and methods for adjusting a source image aspect ratio to match a different target display aspect ratio have been described in language specific to structural features and/or methodological operations or actions, it is understood that the implementations defined in the appended claims are not necessarily limited to the specific features or actions described. For example, while the systems and methods have been described in a context of creating aesthetically pleasing image-based video, the systems and methods can be utilized in other scenarios whenever a source picture needs to be displayed within a target display where the aspect ratio of the source picture does not match the aspect ratio of the target display. Accordingly, the specific features and operations are disclosed as exemplary forms of implementing the claimed subject matter.

The invention claimed is:

1. A computer-implemented method comprising:
   determining, by a processor in a computing device, that a source image has a first aspect ratio that is different than a second aspect ratio of a target display; and
   responsive to the determining:
      automatically detecting primary visual content of the source image, wherein the detecting primary visual content includes determining attention areas of the source image, wherein the attention areas are one or more portions of the source image with high attention value;
      determining an attended area of the source, wherein the attended area is a rectangular region configured to contain the attention areas;
      automatically identifying dimension and position of a crop of the source image that preserves at least a subset of the primary visual content, the crop having a same aspect ratio as the second aspect ratio, wherein the crop is concentric with the center of the attended area;
      calculating an attention index, wherein the attention index is a ratio of the area of the crop to the attended area;
      automatically cropping the source image based on the primary visual content of the source image and the attention index being greater than a pre-defined attention index threshold; and
      responsive to a user dragging a crop boundary, adjusting dimensions and position of an aspect ratio adjusted image and maintaining the aspect ratio equal to the second aspect ratio.

2. A method as recited in claim 1, wherein the target display is an image-based video display.

3. A method as recited in claim 1, wherein the second aspect ratio is determined by an aspect ratio of a target display.

4. A method as recited in claim 1, wherein the primary visual content has substantially high attention value as compared to other visual content of the source image.

5. A method as recited in claim 1, wherein automatically detecting further comprises determining the primary visual content as a function of a ratio of an attended area and a regulated area.

6. A method as recited in claim 1, and further comprising:
   modifying dimension(s) or position of the crop according to user input; and
   cropping the source image according to the dimension(s) or position of the crop to generate an aspect ratio adjusted image.

7. A method as recited in claim 1, further comprising:
   responsive to a user selecting a remove black borders command, removing black borders from at least one selected source image to generate a selected aspect ratio adjusted image;
   presenting a user selectable control, wherein the user selectable control includes controls designating at least one of acceptance of at least one edited image, rejection of at least one edited image, and yes to all, wherein yes to all is configured to designated automatic removal of black borders from a queue of a plurality of imported source images;
   compiling an image based video from one or more of selected aspect ratio adjusted image and aspect ratio adjusted image.

8. A computer-readable medium storing computer-program instructions operable to:
   determine that a source image has a first aspect ratio that is different than a second aspect ratio of a target display; and
   responsive to the determining:
      automatically detecting primary visual content of the source image, wherein the detecting primary visual content includes determining attention areas of the source image, wherein the attention areas are one or more portions of the source image with high attention value;
      determining an attended area of the source, wherein the attended area is a rectangular region configured to contain the attention areas;
      automatically identifying dimension and position of a crop of the source image that preserves at least a subset of the primary visual content, the crop having a same aspect ratio as the second aspect ratio, wherein the crop is concentric with the center of the attended area;
      calculating an attention index, wherein the attention index is a ratio of the area of the crop to the attended area;
      automatically cropping the source image based on the primary visual content of the source image and the attention index being greater than a pre-defined attention index threshold;
      concurrently presenting the source image and an aspect ratio adjusted image; and
      compiling an aspect ratio adjusted image into an image-based video.

9. A computer-readable medium as recited in claim 8, wherein the second aspect ratio is determined by an aspect ratio of a target display.

10. A computer-readable medium as recited in claim 8, wherein automatically detecting further comprises determining the primary visual content as a function of a ratio of an attended area and a regulated area.

11. A computer-readable medium as recited in claim 8, further comprising computer-program instructions for automatically cropping the source image according to the dimension and position of the crop to generate an aspect ratio adjusted image.

12. A computer-readable medium as recited in claim 8, further comprising computer-program instructions for:
   modifying dimension(s) or position of the crop according to user input such that the second aspect ratio of the crop is maintained; and
   cropping the source image according to the dimension(s) or position of the crop to generate an aspect ratio adjusted image.

13. A computer readable medium recited in claim 8, further comprising computer-program instructions for:
   storing the aspect ratio adjusted image; and
   dynamically presenting the aspect ratio adjusted image.

14. A computer readable medium recited in claim 13, wherein the computer-program instructions for dynamically presenting the aspect ratio adjusted image further comprise instructions for:
   panning the source image such that the second aspect ratio of the crop is maintained; and
   zooming the source image such that the second aspect ratio of the crop is maintained.

15. A computing device comprising:
   a programmable processor; and
   a memory coupled to the processor, the memory storing computer-program instructions operable to:
      determine that a source image has a first aspect ratio that is different than a second aspect ratio of a target display; and
      responsive to the determining:
         automatically detecting primary visual content of the source image, wherein the detecting primary visual content includes determining attention areas of the source image, wherein the attention areas are one or more portions of the source image with high attention value;
         determining an attended area of the source, wherein the attended area is a rectangular region configured to contain the attention areas;
         automatically identifying dimension and position of a crop of the source image that preserves at least a subset of the primary visual content, the crop having a same aspect ratio as the second aspect ratio, wherein the crop is concentric with the center of the attended area;
         calculating an attention index, wherein the attention index is a ratio of the area of the crop to the attended area; and
         automatically cropping the source image based on the primary visual content of the source image and the attention index being greater than a pre-defined attention index threshold.

16. A computing device as recited in claim 15, wherein the second aspect ratio is determined by an aspect ratio of a target display.

17. A computing device as recited in claim 15, wherein the computer-program instructions for automatically detecting further comprise instructions for:
   analyzing the source image to detect one or more portions of the source image with high attention value; and
   wherein the one or more portions comprise the primary visual content of the source image.

18. A computing device as recited in claim 15, further comprising computer-program instructions for automatically cropping the source image according to the dimension and position of the crop to generate an aspect ratio adjusted image.

19. A computing device as recited in claim 15, further comprising computer-program instructions for:
   modifying dimension(s) or position of the crop according to user input such that the second aspect ratio of the crop is maintained; and
   cropping the source image according to the dimension(s) or position of the crop to generate an aspect ratio adjusted image.

* * * * *